United States Patent Office 3,282,894
Patented Nov. 1, 1966

3,282,894
CURABLE MIXTURES OF EPOXY RESINS AND HYDROXYSULFOLENE-ADDUCTS
Erwin Nikles, Allschwil, Hans Batzer, Arlesheim, Otto Ernst, Pfeffingen, Basel-Land, and Heinz Zumstein, Basel, Switzerland, assignors to Ciba Limited, Basel, Switzerland, a company of Switzerland
No Drawing. Filed Apr. 2, 1962, Ser. No. 184,561
Claims priority, application Switzerland, Apr. 6, 1961, 4,005/61; Feb. 6, 1962, 1,420/62
8 Claims. (Cl. 260—47)

It is known that polyamines, such as ethylene diamine or diethylene triamine, can be used as curing agents for epoxy resins. Such curing agents allow the epoxy resins to be cold-cured, that is to say at room temperature, which distinguishes them from the polycarboxylic acid anhydrides conventionally used for hot-curing. However, the gel times of the aforementioned cold-curable mixtures are too long for certain practical applications.

It has also been proposed to use as curing agents for epoxy resins adducts from aliphatic polyamines and sulfolenes. Compared with the usual polyamines such adducts offer the advantage of being less volatile and less toxic.

The gel times of cold-curable mixtures consisting of epoxy resins and such adducts are, however, as a rule approximately as long as those needed by comparable curable mixtures prepared with the use of simple polyamines.

Surprisingly, it has now been found that the curable mixtures can be cured much more rapidly by using as curing agent for epoxy resins adducts from hydroxysulfolenes and polyamines containing at least one active amine hydrogen atom. This effect becomes particularly marked when the curing agent is prepared in situ in the presence of the epoxy resin, for example by first preparing a mixture of hydrosulfolene and epoxy resin and then adding the polyamine. The gel time can be further reduced by using the polyamine in an excess over the stoichiometric proportion required to form the adduct. In such a case there results in situ a mixture of the hydroxysulfolene + polyamine adduct and of unreacted polyamine. It is of course also possible to prepare such a curing agent mixture by first preparing the 1:1 adduct from hydroxysulfolene and polyamine, and then adding excess polyamine to it.

The use of a hydroxysulfolene + polyamine adduct as curing agent for epoxy resins, compared with the use of the known adducts of sulfolenes free from hydroxyl groups and polyamines, has the further advantage that in general the cured resin displays better mechanical properties and more especially improved heat distortion properties. This effect is particularly marked when curing is performed with a mixture of the 1:1-adduct from hydroxysulfolene and polyamine and an excess of unreacted polyamine.

Accordingly, the present invention provides curable mixtures containing (1) An epoxy compound having an epoxy equivalency greater than 1,
(2) An adduct of a hydroxysulfolene with a polyamine containing at least one active amine hydrogen atom, and, if desired,
(3) A polyamine.

It is of advantage to manufacture the adduct in situ in the presence of the epoxy compound, either by adding polyamine to the mixture of epoxy compound and hydroxysulfolene, or by mixing all three constituents together simutlaneously. For this purpose the polyamine may be used in the stoichiometric proportion needed to form the 1:1-adduct, or in an amount exceeding said stoichiometric amount.

The invention also provides a process for curing epoxy compounds having an epoxy equivalency greater than 1 with the aid of adducts of sulfolenes with polyamines, wherein the curing agent used is an adduct from hydroxysulfolene and a polyamine containing at least one active amine hydrogen atom, or is a mixture of such adducts and polyamines, it being of advantage to manufacture the curing agent or mixture of curing agents preferably in situ in the presence of the epoxy compound by mixing the hydroxysulfolene with the polyamine.

The epoxy compounds present in the curable mixtures of the invention have an epoxy equivalency greater than 1, that is to say $x$ epoxide groups calculated from the average molecular weight, $x$ representing a whole or fractional number greater than 1.

As is known, the usual methods of manufacturing polyepoxy compounds generally yield industrial mixtures of compounds having different molecular weights; furthermore, such mixtures contain a share of substances whose terminal epoxide groups have undergone partial hydrolysis. Consequently, the analytically determined value for the epoxy equivalency of such industrial mixtures need not be a whole number which is at least 2, but in any case it must be greater than 1.

As epoxy compounds of the kind defined above there are suitable, for example:

Alicyclic polyepoxides such as vinyl-cyclohexene dioxide, limonene dioxide, dicyclopentadiene dioxide, ethyleneglycol-bis(3:4-epoxytetrahydro-dicyclopentadien-8-yl-)-ether, (3:4-epoxy-tetrahydro-dicyclopentadiene-8-yl)glycidyl ether; epoxidized polybutadienes or copolymers of butadiene with ethylenically unsaturated compounds such as styrene or vinyl acetate; compounds containing two epoxycyclohexyl radicals such as diethyleneglycol-bis-(3:4-epoxy-cyclohexane-carboxylate), bis-3:4-epoxy-cyclohexylmethylsuccinate, 3:4-epoxy-6-methyl-cyclohexylmethyl-3:4-epoxy-6-methyl-cyclohexanecarboxylate and 3:4-epoxy-hexahydrobenzal-3:4-epoxy-cyclohexane-1:1-dimethanol.

Further suitable are polyglycidyl esters such as result from the reaction of a dicarboxylic acid with epichlorohydrin or dichlorohydrin in the presence of alkali. Such polyesters can be derived from aliphatic dicarboxylic acids such as succinic or adipic acid or more especially from aromatic dicarboxylic acids such as phthalic or terephthalic acid. There may be mentioned, for example, diglycidyl adipate and diglycidyl phthalate.

There are further suitable basic polyepoxy compounds such as are obtained by reacting a primary or secondary aliphatic or aromatic diamine, such as aniline, toluidine, 4:4'-diamino-diphenylmethane, 4:4'-di-(monomethylamino)-diphenylmethane or 4:4'-diamino-diphenylsulfone with epichlorohydrin in the presence of alkali.

Preferred use is made of polyglycidyl ethers such as are obtained by etherifying a dihydric or polyhydric alcohol or diphenol or polyphenol with epichlorohydrin or dichlorohydrin in the presence of alkali. These compounds may be derived from glycols such as ethyleneglycol, diethyleneglycol, triethyleneglycol, 1:3-propyleneglycol, 1:4-butyleneglycol, 1:5-pentanediol, 1:6-hexanediol, 2:4:6-hexanetriol, glycerol and more especially from diphenols or polyphenols such as resorcinol, pyrocatechol, hydroquinone, 1:4-dihydroxynaphthalene, condensation products of phenol with formaldehyde of the type of the resoles or novolaks, bis-[para-hydroxyphenyl]-methane, bis-[para-hydroxyphenyl]-methylphenylmethane, bis-[para-hydroxyphenyl]-tolylmethane, 4:4'-dihydroxydiphenyl, bis-[para-hydroxyphenyl]-sulfone and more especially bis-[para-hydroxyphenyl]-dimethylmethane.

Particularly suitable are epoxy resins that are liquid at room temperature, for example those from bis-(para-hydroxyphenyl)-dimethylmethane (bisphenol A) which contain about 3.8 to 5.8 epoxide equivalents per kg. Such epoxy resins correspond, for example, to the average formula

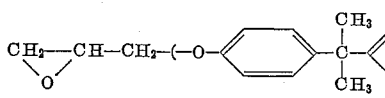 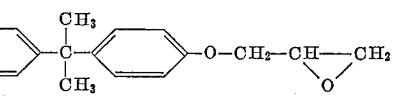

in which $z$ is a whole or fractional small number from 0 to 2.

It is also possible to use mixtures of two or more of the epoxy resins referred to above. The hydroxysulfolene used as starting material to make the adducts either contains no substituents other than the hydroxyl group, or it may be substituted by aliphatic, cycloaliphatic, araliphatic or aromatic hydrocarbon radicals. It is advantageously prepared from a β-sulfolene (3-sulfolene) whose double bond is between carbon atoms 3 and 4.

The afore-mentioned sulfolenes can be prepared by reacting a conjugated diene, such as butadiene, isoprene or chloroprene, with sulfur dioxide. Their manufacture has been described in detail, inter alia, in British specification No. 361,341 and in German specification No. 506,839. Suitable sulfolenes of this type are, for example, sulfolene, 2-methylsulfolene, 2:5-dimethylsulfolene, 2:4-dimethylsulfolene, 3:4-dimethylsulfolene, 3-methylsulfolene, 3-ethylsulfolene, 2-ethylsulfolene, 2-methyl-3-ethyl-sulfolene and 2-methyl-3-propylsulfolene.

When hypochlorous acid is added on to the double bond of these sulfolenes, the corresponding 3-hydroxy-4-chlorosulfolanes are formed. When these compounds are treated with alkali, making sure that the pH value does not rise substantially above 8, there are finally obtained the desired hydroxysulfolenes, accompanied by elimination of HCl.

As examples there may be mentioned 4-hydroxy-2-sulfolene and 4-methyl-4-hydroxy-2-sulfolene.

For forming the adducts with the hydroxysulfolenes use is made of polyamines containing at least one primary or secondary amine group. There are suitable polyamines of this type belonging to the aliphatic, cycloaliphatic, araliphatic or aromatic series. There may be mentioned di-primary alkylene polyamines such, for example as ethylene diamine, diethylene triamine, triethylene tetramine, tetraethylene pentamine, trimethylene diamine, hexamethylene diamine; alkylene polyamines containing a primary amine group and further a tertiary amino group such as dialkyl-amino group, for example N:N-dimethyl-ethylene diamine, N:N-diethyl-ethylene diamine, N:N-dimethyl-1:3-propylene diamine, N:N-diethyl-1:3-propylene diamine, N-methyl-N-ethyl-1:3-propylene diamine, N-methyl-N-butyl-1:3-propylene diamine, N:N-dipropyl-1:3-propylene diamine, N:N-dibutyl-1:3-propylene diamine, N:N-di-(2-ethylhexyl)-1:3-propylene diamine; N-hydroxyalkyl-alkylene polyamines such, for example, as N-hydroxyethyl-ethylene diamine, N-hydroxyethyl-pentamethylene diamine, N-hydroxypropyl-tetramethylene diamine, N-hydroxyethyl-diethylene triamine, N:N-di-(hydroxyethyl)-diethylene triamine, N:N″-di-(hydroxyethyl)-diethylene triamine, N-hydroxypropyl-diethylene triamine, N:N-di-(hydroxypropyl)-diethylene triamine, N:N″-di-(hydroxypropyl)-diethylene triamine, N:N:N″-tri-(hydroxypropyl)-triethylene tetramine, N-hydroxyethyl-propylene diamine, N-hydroxypropyl-propylene diamine, N-hydroxyethyl-dipropylene triamine, N:N-di(hydroxyethyl)-dipropylene triamine, N:N:N′-tri(hydroxyethyl)-triethylene tetramine; cyanoethylated primary polyamines such, for example, as the reaction products of 1 to 2 molecular proportions of acrylonitrile with 1 molecular proportion of ethylene diamine, diethylene triamine or triethylene tetramine; cycloaliphatic polyamines such as 1:2-diaminocyclohexane, 1:4-diaminocyclohexane, 1:3-diaminocyclohexane, 1:2-diammino-4-ethylcyclohexane, 1:4-diamino-3:6-diethyl-cyclohexane, 1-cyclohexyl-3:4-diaminocyclohexane, 1:4-bis-methylaminocyclohexane, dodecahydrobenzidine, 4:4′-diamino-dicyclohexylmethane, 4:4′-diamino-dicyclohexylpropane, 4:4′-diamino-tricyclohexylmethane, N-cyclohexyl-propylene diamine, N-cyclohexyl-ethylene diamine, N:N′-dicyclohexyl-propylene diamine, N:N′-dicyclohexyl-diethylene triamine, N:N′-di-(2-ethylcyclohexyl)-propylene diamine, N:N′-di-[cyclohexylmethyl]-ethylene diamine; aralipathic polyamines such, for example, as N-phenylpropylene diamine, N-[2-ethylphenyl]-propylene diamine, N-[4-phenylcyclohexyl]-ethylene diamine, 1:4-bis-[ε-aminobutyl]-tetraethylbenzene, bis-[β-aminoethyl]-durene, bis-[β-amino-n-propyl]-durene, bis-[ω-aminohexyl]-durene, bis-[γ-aminopropyl]-isodurene, 1:4-bis-[β-aminoethyl]-2:3:6-trimethylbenzene, 1:4-bis-[β-aminoethyl]-benzene, bis-[β-aminoethyl]-mesitylene; ortho-xylylene diamine, para-xylylene diamine, metaxylylene diamine; aromatic polyamines, such, for example, as benzidine, 1:2-phenylene diamine, 1:3-phenylene diamine, 1:4-phenylene diamine, 4:4′-diaminodiphenylmethane, 4:4′-diamino-diphenylamine, 4:4′-diaminodiphenyl-dimethylmethane, 4:4′-diaminodiphenyl-sulfide, -sulfone or -oxide, 4:4′-diaminodiphenyl urea, 2:2′-diamino-diphenylmethane, 4:4′-di-[N-monomethylamino]-diphenylmethane, 4:4′-di-[N-monoethylamino]-diphenylmethane, 4:4′-di-[N-monobutylamino]-diphenylmethane; hydrazine and its derivatives such as phenylhydrazine, 2-phenyl-2-hydroxyethylhydrazine, and 2-hydroxyethyl-hydrazine; finally heterocyclic polyamines such as piperazine.

It will be readily understood that mixtures of two or more such polyamines are likewise suitable.

Compounds belonging to a preferred type of adducts of hydroxysulfolenes with polyamines to be used in the present process correspond to the formula

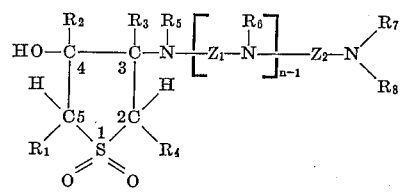

in which each of the radicals $R_1$ to $R_8$ represents a hydrogen atom or a lower alkyl group with 1 to 4 carbon atoms; $Z_1$ and $Z_2$ each represents an aliphatic, cycloaliphatic, araliphatic or aromatic hydrocarbon radical, and $n$ is a whole number from 1 to 4.

The adducts are prepared by simply mixing the polyamine with the hydroxysulfolene at room temperature, since the additive reaction is in general exothermic. If necessary, the reactants are moderately heated, for example to a temperature of 60 to 80° C. As mentioned above it is of advantage to prepare the curable mixtures of the invention by producing the adduct of polyamine with hydroxysulfolene in situ in the presence of the epoxy compound. This is achieved most advantageously by first mixing the epoxy compound with the hydroxysulfolene, whereupon the whole is mixed with the polyamine and finally cured. In this manner it is possible to manufacture commercial products that can be stored practically indefinitely and consist of two components, more especially two-component adhesives, two-component putties or two-component lacquers. In this case the adduct is of course formed only when the ultimate user mixes the two separate components together to form the curable compound suitable for immediate application. Alternatively, it is in certain cases possible to mix the three components—i.e.

the epoxy resin, the polyamine and the sulfolene—simultaneously.

As a possible third component the curable mixtures of the invention may further contain a share of unreacted polyamine. Apart from the above-mentioned polyamines containing at least one reactive amine hydrogen atom there may be used also as the optional third component a purely tertiary amine, for example a fully alkylated alkylene polyamine such as tetramethyl ethylene diamine, tetramethyl diethylene triamine, pentamethyl diethylene triamine, hexamethyl triethylene tetramine, heptamethyl tetraethylene pentamine or a Mannich's base such as tri-(dimethylaminomethyl)phenol.

It has further been found that cured products having optimum properties—more especially flexural strength, impact strength and heat distortion point according to Martens—are obtained by using for every epoxide equivalent of the epoxy compound 0.2 to 2.0, preferably 0.5 to 1.5 gram-atoms of active amine hydrogen atoms and/or N- bound alkyl groups of the polyamine + hydroxysulfolene adduct or of the amine-curing agent mixture of polyamine and polyamine + hydroxysulfolene adduct.

When a curing agent mixture of polyamine and polyamine + hydroxysulfolene adduct is used, it is of advantage to react every molecular proportion of polyamine with 0.25 to 4.0, preferably 0.5 to 2.0, molecular proportions of the polyamine + sulfolene adduct.

The term "curing" as used in this context describes the conversion of the epoxy compound into an insoluble and infusible resin.

The curable mixtures of the invention may further contain suitable plasticizers (such as dibutyl phthalate, dioctyl phthalate or tricresyl phosphate), inert diluents or so-called active diluents, more especially mono-epoxides, for example butyl glycide or cresyl glycide.

Furthermore, there may be added to the curable mixtures of the invention at any stage prior to the curing operation other usual additives such as fillers, dyestuffs, pigments, flame-proofing substances, mould lubricants and the like. Suitable extenders and fillers are, for example, asphalt, bitumen, glass fibers, mica, quartz meal, cellulose, kaolin, ground dolomite, colloidal silicic acid having a large specific surface (Aerosil) or metal powders, such as aluminum powder.

The curable mixtures of the invention can be used with or without fillers, if desired in the form of solutions or emulsions, as laminating resins, paints, lacquers, dipping or casting resins, moulding compositions, sealing or pore-filling compounds, putties, floorings, potting and insulating compounds for the electrical industry, adhesives or the like, as well as for the manufacture of such products.

Parts and percentages in the following examples are by weight, and the relationship between parts by weight and parts by volume is the same as between the kilogram and the liter.

The curable mixtures described in the examples were prepared with the use of the following hydroxysulfolenes:

(I) *4-hydroxy-2-sulfolene*

1023 parts of trans-3-hydroxy-4-chlorosulfolane are suspended in 3000 parts of water and heated to about 50° C. While stirring, a solution of 240 parts of sodium hydroxide in 1000 parts of water is then added dropwise at a rate such that the pH value of the mixture does not exceed 8.5. After the sodium hydroxide has been added, the solution is evaporated under vacuum. The residue is treated with 3×500 parts by volume of ethyl acetate and each time filtered. The combined filtrates are evaporated. The residue is distilled in a high vacuum. At 155–165° C. under 0.05 mm. Hg pressure 725 parts (90% of the theoretical yield) of 4-hydroxy-2-sulfolene pass over.

(II) *4-methyl-4-hydroxy-2-sulfolene*

A solution of 369 parts of isoprenesulfone chlorohydrin in 1800 parts by volume of ethyl acetate is heated to the boil and 260 parts of triethylamine are added dropwise. During the reaction triethylamine hydrochloride precipitates. The mixture is refluxed for 3 hours, then allowed to cool and filtered. The filtrate is evaporated and the residue is distilled in a high vacuum.

Yield: 269 parts (91% of the theoretical) of 4-methyl-4-hydroxy-2-sulfolene in the form of a yellowish liquid boiling at 148° C. under 0.04 mm. Hg pressure.

*Analysis.*—$C_5H_8O_3S$ calculated: C, 40.53; H, 5.44%. Found: C, 40.76; H, 5.46%.

The isoprenesulfone chlorohydrin used above is prepared in the following manner:

Into a solution of 264 parts of commercial isoprenesulfone in 3000 parts of water which is maintained by moderate external cooling at 50° C. there are introduced within 1½ hours 142 parts of chlorine gas. The solution is allowed to cool to room temperature and then extracted with 3×300 parts by volume of benzene. The aqueous phase is evaporated in a water-jet vacuum. The residue is distilled in a high vacuum and yields 273 parts (74% of the theoretical yield) of isoprenesulfone chlorohydrin boiling at 153–163° C. under about 0.2 mm. Hg pressure.

*Analysis.*—$C_5H_9ClO_3S$ Chlorine content: Calculated 19.2%. Found 19.6%.

*Example 1*

100 parts each of a polyepoxy compound which is liquid at room temperature, contains 5.3 epoxide equivalents per kg. and has been prepared by reacting epichlorohydrin with bis-(para-hydroxyphenyl)-dimethylmethane in the presence of alkali, are mixed at room temperature in Test 1 with 10 parts of triethylene tetramine and in Test 2 with 15 parts of a curing agent mixture consisting of 7.5 parts of the adduct A from triethylene tetramine with 4-hydroxy-2-sulfolene and 7.5 parts of triethylene tetramine described below.

100 grams of each of these mixtures are adjusted to exactly 20° C., then poured at room temperature (25° C.) into tins of 4 cm. height and 6 cm. diameter, and the gel times are determined.

One more specimen each of the resulting curable casting resin mixtures is poured at room temperature into aluminum tubes (40 × 10 × 140 mm.) and each casting is cured for 24 hours at 40° C.

The gel times and properties of the cured castings are shown in the following table:

| Test | Gel time at room temperature of a specimen of 100 grams, in minutes | Flexural strength, kg./mm.² | Heat distortion point according to Martens (DIN) in °C. |
|---|---|---|---|
| 1 | 57 | 11.0 | 63 |
| 2 | 28 | 10.6 | 70 |

The adduct of triethylene tetramine with hydroxysulfolene (adduct A) is prepared in the following manner:

26.8 parts of 4-hydroxy-2-sulfolene are stirred portionwise into 29.2 parts of commercial triethylene tetramine. The mixture heats up to about 70° C. After cooling, a highly viscous adduct is obtained.

*Example 2*

In 100 parts each of the polyepoxy compound described in Example 1 (which is liquid at room temperature and contains 5.3 epoxide equivalents per kg.) there are incorporated at room temperature as curing agent, in Test 1: 28 parts of the adduct from sulfolene and triethylene tetramine described below (adduct B), in Test 2: 29 parts of the adduct A from 4-hydroxy-2-sulfolene and triethylene tetramine described in Example 1, and in Test 3: a curing agent mixture consisting of 7.5 parts of adduct A and 7.5 parts of triethylene tetramine.

One portion each of the curable casting resin mixtures prepared as described above is poured at room temperature into aluminum tubes (40 x 10 x 140 mm.) and each casting is cured for 24 hours at 40° C.

With one portion each of the casting resin specimens thus prepared the gel time of 100 grams of epoxy resin + curing agent mixture is determined according to Example 1.

The gel time and the heat distortion point according to Martens of each specimen tested, after curing, are shown in the following table:

| Test | Gel time of 100 grams of a mixture of epoxy resin + curing agent, at 20° C., in minutes | Heat distortion point according to Martens (DIN) in ° C. |
| --- | --- | --- |
| 1 | 61 | 55 |
| 2 | 26 | 67 |
| 3 | 28 | 70 |

The adduct B of sulfolene and triethylene tetramine is prepared as follows:

A solution of 590 parts of commercial β-sulfolene (butadienesulfone) in 730 parts of triethylene tetramine is heated for 24 hours at 60° C. and then for 24 hours at 80° C.

Volatile constituents are removed by heating the mixture for 2 hours at 100° C. in a high vacuum, to leave as residue 1303 parts of the adduct.

*Example 3*

In 100 parts each of the polyepoxy compound described in Example 1 (which is liquid at room temperature and contains 5.3 epoxide equivalents per kg.) there are incorporated at room temperature as curing agent in Test 1: 12.8 parts of triethylene tetramine, and in Test 2: 21 parts of a curing agent mixture which is liquid at room temperature and has been prepared by dissolving at 100° C. 10.5 parts of the adduct C of bis-(para-aminophenyl)-methane and 4-hydroxy-2-sulfolene and 10.5 parts of triethylene tetramine, which is solid at room temperature, described below.

Using a portion each of the resulting casting resin mixtures, the gel times and the maximum exothermic reaction temperatures of 100 grams of epoxy resin + curing agent mixture were determined according to Example 1:

| Test | Gel time of 100 grams of epoxy resin + curing agent at 20° C. gelled after (minutes)— | Maximum reaction temperature in ° C. |
| --- | --- | --- |
| 1 | 21 | 220 |
| 2 | 13 | 152 |

The casting resin mixture of the invention (specimen 2) has, surprisingly, a lower maximum exothermic reaction temperature and at the same time a shorter gelling time than the known casting resin mixture (specimen 1).

The adduct C of 4-hydroxysulfolene and para:para'-diaminodiphenylmethane is prepared by heating a mixture of 4.0 parts of commercial bis-(para-aminophenyl)-methane and 5.4 parts of 4-hydroxy-2-sulfolene for 2 days at 120° C. After cooling, the adduct is obtained in the form of an amorphous, brittle substance.

*Example 4*

Specimens of 100 parts each of the polyepoxy compound described in Example 1 (which is liquid at room temperature and contains 5.3 epoxide equivalents per kg.) are mixed at room temperature: in Test 1: with 3 parts; in Test 2: with 9 parts; in Test 3: with 10 parts; and in Test 4: with 15 parts, of 4-hydroxy-2-sulfolene. Specimen 5 contains only the known epoxy compound described above.

In each test specimen 10 parts of triethylene tetramine are incorporated at room temperature as curing agent.

On portion of each curable casting mixture thus prepared is poured at room temperature into aluminum tubes (40 x 10 x 140 mm.) and each casting is cured for 24 hours at 40° C.

One further portion each of the resulting casting resin mixtures is used according to Example 1 for the determination of the time taken by 100 grams of the epoxyresin + curing agent mixture to gelatinize.

The gel times and properties of the cured castings are shown in the following table:

| Test | Gel time of 100 grams of a mixture of epoxy resin + curing agent, at 20° C., in minutes | Heat distortion point according to Martens (DIN) in ° C. |
| --- | --- | --- |
| 1 | 28 | 62 |
| 2 | 13 | 66 |
| 3 | 12 | 69 |
| 4 | 8 | 69 |
| 5 | 55 | 57 |

*Example 5*

In 100 parts of the polyepoxy compound described in Example 1, which is liquid at room temperature and contains 5.3 epoxide equivalents per kg., there are dissolved 5 parts of 4-hydroxy-2-sulfolene (specimen 1).

Specimen 2 contains only the above-mentioned known epoxy compound.

In each of the two specimens 10 parts of N:N-di-methylaminopropylamine are incorporated as curing agent at room temperature. One portion each of the resulting curable casting resin mixtures is poured at room temperature, as described in Example 1, into aluminum tubes and cured.

One further portion each is used for determining the gel time according to Example 1.

The gel times and properties of the cured castings are shown in the following table:

| Test | Gel time of 100 g. of a mixture of epoxy resin + curing agent at 20° C., in minutes | Flexural strength, kg./mm.² | Impact strength, cm.-kg./cm.² | Heat distortion point according to Martens (DIN) in ° C. |
| --- | --- | --- | --- | --- |
| 1 | 25 | 12.5 | 19 | 70 |
| 2 | 82 | 8.5 | 21 | 64 |

*Example 6*

The procedure used is as described in Example 4, except that there are used in Test 1: 3 parts of 4-methyl-4-hydroxy-2-sulfolene instead of 3 parts of 4-hydroxy-2-sulfolene, and in Test 2: 10 parts of 4-methyl-4-hydroxy-2-sulfolene instead of 10 parts of 4-hydroxy-2-sulfolene, and in Test 3: only the polyepoxy compound described in Example 1.

The gel times and properties of the cured castings are shown in the following table:

| Test | Gel time of 100 g. of a mixture of epoxy resin + curing agent at 20° C., in minutes | Flexural strength, kg./mm.² | Impact strength, cm.-kg./cm.² | Heat distortion point according to Martens (DIN) in ° C. |
| --- | --- | --- | --- | --- |
| 1 | 28 | 13.3 | 4.0 | 60 |
| 2 | 12 | 10.0 | 5.0 | 66 |
| 3 | 55 | 14.2 | 6.1 | 57 |

*Example 7*

In Test (1) 5 parts of 4-hydroxy-2-sulfolene are dissolved in 100 parts of the epoxy compound described in Example 1 which is liquid at room temperature and contains 5.3 epoxide equivalents per kg. Specimen 2 contains only the above-mentioned known epoxy compound.

In each specimen there are incorporated as curing agent 13 parts of a curing agent mixture which is liquid at room temperature and consists of 4.5 parts of triethylene tetramine, 4.5 parts of N:N-dimethylamino-propylamine and 4 parts of bis-(para-aminophenyl)-methane.

These casting resin speciments are poured into aluminum tubes and each is cured for 24 hours at room temperature (20–25° C.) as described in Example 1.

A further portion each is used to determine the gel time according to Example 1. The gel times and the properties of the cured castings are shown in the following table:

| Test | Gel time of 100 g. of a mixture of epoxy resin + curing agent at 20° C., in minutes | Flexural strength, kg./mm.² | Impact strength, cm.-kg./cm.² | Heat distortion point according to Martens (DIN) in ° C. |
|---|---|---|---|---|
| 1 | 22 | 12.6 | 10.9 | 80 |
| 2 | 60 | * | * | * |

*Too brittle for machining.

Example 8

In Test (1) 100 parts of the polyepoxy compound of Example 1, which is liquid at room temperature and contains 5.3 epoxide equivalents per kg., are mixed at room temperature with 17.6 parts of 4-hydroxy-2-sulfolene. Specimen 2 contains only the above-mentioned known epoxy compound.

In each specimen 31.5 parts of 4:4'-diamino-dicyclohexyl dimethylmethane are incorporated at room temperature as curing agent.

One portion each of the resulting curable casting resin mixtures is poured at room temperature, as described in Example 1, into aluminum tubes (40 x 10 x 140 mm.) and each casting is cured for 14 hours at 25° C.

A third portion each of the resulting specimens of casting resins is used to determine the gel time of 100 grams of each epoxy resin+curing agent mixture, according to Example 1.

The gel times and properties of the cured specimens of casting resins are shown in the following table:

| Test | Gel time of 100 g. of a mixture of epoxy resin+ curing agent at 20° C., in minutes | Flexural strength, kg./mm.² | Impact strength, cm.-kg./cm.² | Heat distortion point according to Martens (DIN) in ° C. |
|---|---|---|---|---|
| 1 | 20 | 11.8 | 6.7 | 54 |
| 2 | Over 120 | (*) | (*) | (*) |

*Too brittle for machining.

Example 9

In Test (1) 10 parts of the 4-hydroxy-2-sulfolene, which is liquid at room temperature, are dissolved at room temperature in 100 parts of the polyepoxy compound of Example 1, which is liquid at room temperature, contains 5.3 epoxide equivalents per kg. and has a viscosity of 10,000 centipoises at 25° C. In Test (2) there is used bis-(para-hydroxyphenyl)-dimethylmethane which is a known curing accelerator instead of 4-hydroxy-2-sulfolene. The former compound melts at 148° C. and dissolves in the polyepoxy compound only at about 80 to 90° C.

As agent producing thixotropy there are incorporated at room temperature in each specimen 5 parts of a chemically pure colloidal silica (marketed under the registered trademark "Aerosil 2491/380," having a large specific surface and a particle size range of 3–15μ) as well as a hardening agent consisting of 10 parts of triethylene tetramine and 0.75 part of "Aerosil."

Both specimens (100 grams each) have a gel time of 12 minutes. While the curable compound resulting from specimen 1 is very easy to apply with a spatula or brush and does not run off even from vertical surfaces, the compound resulting from specimen 2 is viscid, difficult to apply and immediately runs off a vertical surface notwithstanding its substantially higher viscosity.

The curable compound used in Test 1 is therefore an excellent putty, crack filler, bonding agent, surface protective agent and as a substitute for tin fillers in motor-body building.

What is claimed is:

1. A process for curing an epoxy resin which comprises contacting a 1,2-epoxy compound having a 1,2-epoxy equivalency greater than 1 with an adduct of the general formula $$HO-\underset{H}{\overset{R_2}{C}}-\underset{\underset{R_1}{\overset{C_5}{\diagdown}}\underset{\overset{\diagup}{S}}{\diagup}\underset{\overset{\diagdown}{O}}{\diagdown}R_4}{\overset{R_3}{\underset{4}{C}}\overset{3}{\underset{H}{|}}}-\overset{R_5}{\underset{|}{N}}-\left[Z_1-\overset{R_6}{\underset{|}{N}}-\right]_{n-1}Z_2-N\overset{R_7}{\underset{R_8}{\diagdown}}$$

in which each of the radicals $R_1$ to $R_8$ is a member selected from the class consisting of hydrogen atom and lower alkyl group with 1 to 4 carbon atoms; $Z_1$ and $Z_2$ each are members selected from the class consisting of divalent aliphatic hydrocarbon, cycloaliphatic hydrocarbon, araliphatic hydrocarbon and aromatic hydrocarbon radical, and $n$ is a whole number from 1 to 4.

2. A process according to claim 1 wherein there is additionally present a polyamine selected from the group consisting of polyalkylenepolyamine and alkylenediamine.

3. A process according to claim 1 wherein the 1,2-epoxy compound is a polyglycidyl ether of a polyhydric phenol.

4. A process according to claim 1 wherein the 1,2-epoxy compound is a polyglycidyl ether of bis(para-hydroxyphenyl)-dimethylmethane.

5. A hard solid resinous mass obtained by contacting a 1,2-epoxy compound having a 1,2-epoxy equivalency greater than 1 with, as a curing agent, an adduct of the general formula $$HO-\underset{H}{\overset{R_2}{C}}-\underset{\underset{R_1}{\overset{C_5}{\diagdown}}\underset{\overset{\diagup}{S}}{\diagup}\underset{\overset{\diagdown}{O}}{\diagdown}R_4}{\overset{R_3}{\underset{4}{C}}\overset{3}{\underset{H}{|}}}-\overset{R_5}{\underset{|}{N}}-\left[Z_1-\overset{R_6}{\underset{|}{N}}-\right]_{n-1}Z_2-N\overset{R_7}{\underset{R_8}{\diagdown}}$$

in which each of the radicals $R_1$ to $R_8$ is a member selected from the class consisting of hydrogen atom and lower alkyl group with 1 to 4 carbon atoms; $Z_1$ and $Z_2$ each are members selected from the class consisting of divalent aliphatic hydrocarbon, cycloaliphatic hydrocarbon, araliphatic hydrocarbon and aromatic hydrocarbon radical, and $n$ is a whole number from 1 to 4.

6. A hard solid resinous mass obtained by contacting a 1,2-epoxy compound having a 1,2-epoxy equivalency greater than 1 with an adduct of the general formula $$HO-\underset{H}{\overset{R_2}{C}}-\underset{\underset{R_1}{\overset{C_5}{\diagdown}}\underset{\overset{\diagup}{S}}{\diagup}\underset{\overset{\diagdown}{O}}{\diagdown}R_4}{\overset{R_3}{\underset{4}{C}}\overset{3}{\underset{H}{|}}}-\overset{R_5}{\underset{|}{N}}-\left[Z_1-\overset{R_6}{\underset{|}{N}}-\right]_{n-1}Z_2-N\overset{R_7}{\underset{R_8}{\diagdown}}$$

and a polyamine selected from the group consisting of polyalkylenepolyamine and alkylenediamine.

7. A hard solid resinous mass according to claim 5 wherein the 1,2-epoxy compound is a polyglycidyl ether of a polyhydric phenol.

8. A hard solid resinous mass according to claim 5 wherein the 1,2-epoxy compound is a polyglycidyl ether of bis(para-hydroxyphenyl)-dimethylmethane.

References Cited by the Examiner

UNITED STATES PATENTS 3,041,352   6/1962   Newey _____ 260—47

OTHER REFERENCES

Grant: "Hackh's Chemical Dictionary," 3rd Ed., McGraw-Hill Book Co., Inc. 1944, page 310 relied on.

WILLIAM H. SHORT, *Primary Examiner.*
HAROLD BURSTEIN, *Examiner.*
A. LIBERMAN, T. D. KERWIN, *Assistant Examiners.*